(12) United States Patent
Hee Seung

(10) Patent No.: US 10,897,664 B2
(45) Date of Patent: Jan. 19, 2021

(54) VOICE ASSISTED SUNGLASSES FOR RUNNING OF THE BLIND

(71) Applicant: Kim Hee Seung, Daejeon (KR)

(72) Inventor: Kim Hee Seung, Daejeon (KR)

( * ) Notice: Subject to any disclaimer, the term of this patent is extended or adjusted under 35 U.S.C. 154(b) by 0 days.

(21) Appl. No.: 16/375,876

(22) Filed: Apr. 5, 2019

(65) Prior Publication Data
US 2019/0387298 A1 Dec. 19, 2019

(30) Foreign Application Priority Data
Jun. 15, 2018 (KR) .......................... 10-2018-0068576

(51) Int. Cl.
*H04R 1/10* (2006.01)
*G09B 21/00* (2006.01)
*H04W 4/024* (2018.01)

(52) U.S. Cl.
CPC ........... *H04R 1/105* (2013.01); *G09B 21/006* (2013.01); *H04R 1/1025* (2013.01); *H04W 4/024* (2018.02); *H04R 2430/01* (2013.01); *H04R 2460/13* (2013.01)

(58) Field of Classification Search
CPC ........ G02C 5/143; G02C 5/146; G02C 11/06; G02C 11/10; H04R 1/105; H04R 1/1025; H04R 2430/01; H04R 2430/13
See application file for complete search history.

(56) References Cited

U.S. PATENT DOCUMENTS

| 2006/0132382 A1* | 6/2006 | Jannard | G02B 27/017 345/8 |
| 2007/0046887 A1* | 3/2007 | Howell | G02C 11/10 351/41 |
| 2011/0286615 A1* | 11/2011 | Olodort | H04R 1/1025 381/311 |
| 2014/0267642 A1* | 9/2014 | Wexler | G09B 21/001 348/62 |

FOREIGN PATENT DOCUMENTS

KR 1020120035745 A 4/2012

* cited by examiner

*Primary Examiner* — Sunita Joshi
(74) *Attorney, Agent, or Firm* — STIP Law Group, LLC

(57) ABSTRACT

The present invention relates to voice assisted sunglasses for running of the blind, particularly, to voice assisted sunglasses including a mount that is worn on the body of a user, and a control unit including a user movement information controller combined with the mount and measuring a moving distance and a moving speed of the user and an output unit informing the user of the information obtained by the movement information controller using voice, thereby it can assist the running of the user.

2 Claims, 7 Drawing Sheets

VOICE ASSISTED SUNGLASSES FOR RUNNING OF THE BLIND

CROSS-REFERENCE TO RELATED APPLICATIONS

This application claims the priority of the Korean Patent Applications NO 10-2018-0068576 filed on Jun. 15, 2018, in the Korean Intellectual Property Office, the disclosure of which is incorporated herein by reference.

BACKGROUND OF THE INVENTION

Field of the Invention

The present invention relates to a running assistant device, particularly, to sunglasses for running of the blind and, more particularly, to a running assistant device that can assist a user who runs and runs a marathon by informing the user of information such as a moving distance, a moving speed, a moving time, and a location.

Description of the Related Art

At present, mobile phones and watches etc. based on GPS as items of assisting the running of user are commonly used.

However, in a case of the mobile pone of assisting the running of user based on GPS, since it has a weight over a certain level, there are disadvantages in that it has any discomfort in carrying and is difficult to wear it in clothes. Also, in a case of the watch of assisting the running of user based on GPS, there are advantages in that it is lightweight and easy to wear in comparison with the mobile phone. However, the users, who do not usually wear a watch, can feel uncomfortable. Further, since the wearing position thereof is distant from the user's ear over regular distance, there is a problem in that it is difficult to transmit their position and speed information etc. for the running aid to the user.

More concretely, in a case of the running auxiliary devices in the form of the mobile phone and the watch based on GPS, since there are disadvantages in that it is heavy and uncomfortable to wear and is difficult to transmit the information, it is hard for widely commercial use.

In particular, because the visually impaired marathoners including wheelchair marathoners cannot run alone, they are running with the guide runner with their arms tied up in a ribbon.

At this time, the guide runner informs frequently the visually impaired runner of the visual information, that is, the current distance and speed. However, the visually impaired runner feels sorry when he continues to ask for his current record and the guide runner also becomes more and more fatigued while running, resulting in stress.

Therefore, in order to solve the above problems, it is necessary for the development of the voice assisted sunglasses as a new running auxiliary device capable of pacing themselves and focusing on improving the record thereof by means of the blind as well as the general public by continuously receiving their moving distance and speed information by a voice.

PATENT LITERATURE

Patent Literature 1: KR 1020120035745 A (Apr. 16, 2012; Title: SYSTEM AND METHOD FOR PROVIDING TRACE DATA USING GPS IN PORTABLE TERMINAL)

SUMMARY OF THE INVENTION

The present invention has been made in an effort to solve the problems and an object of the present invention is to provide a new type of running assistant device that can remove inconvenience that a user may feel when wearing a running assistant device.

Another object of the present invention is to provide a voice assisted sunglasses that can assist a blind person to run and enable a blind person to be provided with speed information, location information, time information, distance information, etc. using voice through easy operation.

Another object of the present invention is to provide a running assistant device that can more efficiently transmit information to a user.

According to an aspect of the invention to achieve the object described above, there is provided a voice assisted sunglasses including: a mount (100) that is worn on the body of a user; and a control unit (200) including a user movement information controller (210) combined with the mount (100) and measuring a moving distance and a moving speed of the user, and an output unit (220) informing the user of the information obtained by the movement information controller (210) into voice.

Also, the mount (100) includes: an eye protector (110) designed to be disposed ahead of user's eyes to protect the user's eyes; and temples (120) which are coupled to both width-directional sides of the eye protector (110) and are worn on both sides of the user's head.

Further, the output unit (220) includes: a bond conduction speaker (221); and a bone conduction driving module (222) that transmits signals to the bone conduction speaker (221) in response to information transmitted from the movement information controller (210).

Moreover, the control unit (200) further includes: a battery unit (230) including a charging terminal (231) that is connected to an external charging cable; a battery (232) that is charged with power transmitted through the charging terminal (231); and a charging checker (233) that transmits the power input through the charging terminal (231) to the battery (232) and checks the charging state of the battery (232).

Also, the control unit (200) further includes a switch unit (240) including: an operation switch (241) that operates the movement information controller (210); a volume switch (242) that controls the volume of the output unit (220); and a real-time checking switch (243) that immediately transmits the location, moving distance, moving speed, and moving time of a user measured by the movement information controller (210) to the user through the output unit (220) when it is clicked.

Further, the eye protector (110) and the temples (120) are hinged to each other, and the charging terminal (231) is disposed at a longitudinal first end of each of the temples (120) hinged to the eye protector (110).

Further, the temples (120) includes a lighting portion (121) formed at a longitudinal second end thereof.

Further, motion recognition cameras (111) that recognize hand motions of a user are disposed on the bottom of width-directional ends of the eye protector (110), so the movement information controller (210) can transmit the moving distance and the moving speed to a user through the output unit (220) when it recognizes the user making specific hand motions through the motion recognition cameras (111).

BRIEF DESCRIPTION OF THE DRAWINGS

The above and other objects, features and advantages of the present invention will be more apparent from the following detailed description taken in conjunction with the accompanying drawings, in which.

REFERENCE SIGNS LIST

Figure 1:
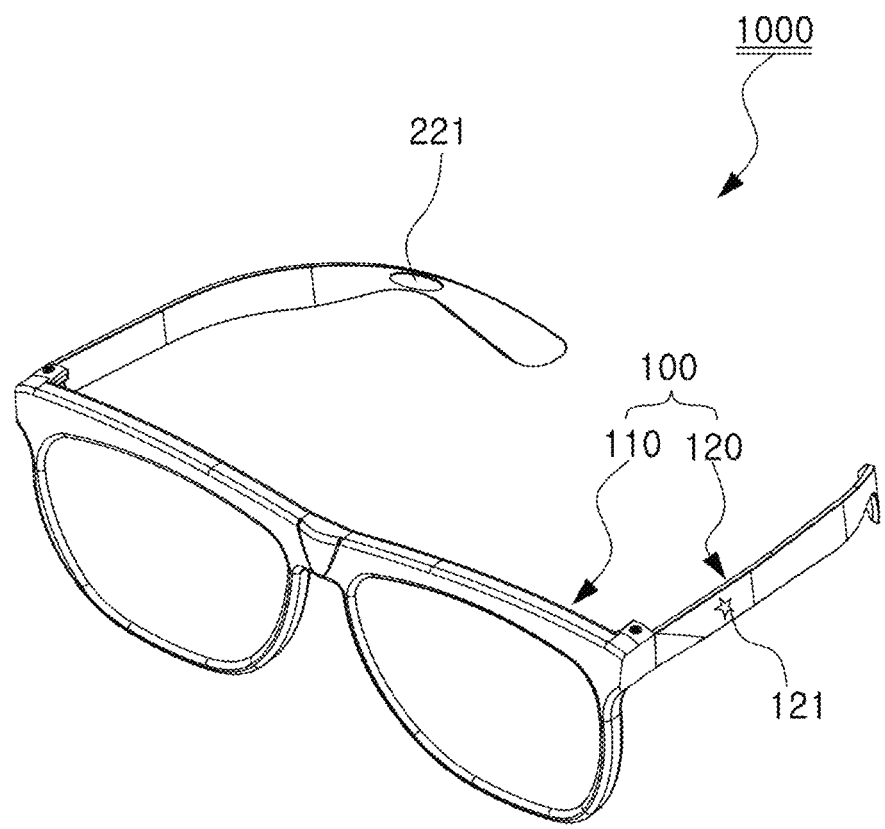
FIG. 1 is a perspective view showing a voice assisted sunglasses according to the present invention.

100: mount
110: eye protector
111: motion recognition camera
120: temples
121: lighting portion
200: control unit
210: movement information controller
220: output unit
221: bone conduction speaker
222: bone conduction driving module
230: battery unit
231: charging terminal
232: battery
233: charging checker
240: switch unit
241: operation switch
242: volume switch
243: real-time checking switch

DETAILED DESCRIPTION OF THE PREFERRED EMBODIMENT

The features, the advantages, and the achievement methods thereof on the embodiments of the present invention will be more apparent from the following detailed description taken in confluence with the accompanying drawings. Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them. This invention can be implemented in many different forms without departing from technical aspects or main features.

Hereinafter, voice assisted sunglasses according to the present invention are described with reference to the accompanying drawings.

Figure 2:
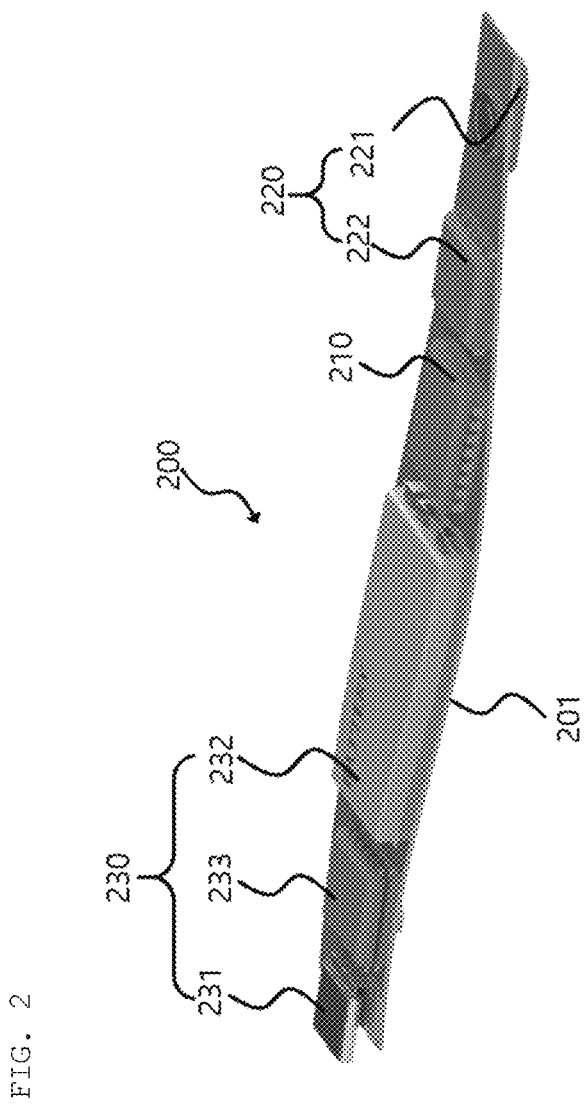
FIG. 2 is a perspective view showing a control unit disposed in the mount according to the present invention.

FIG. 1 is a perspective view showing a mount (100) of voice assisted sunglasses (1000) of the present invention, and FIG. 2 is a perspective view showing a control unit (200) disposed in the mount (100).

Referring to FIGS. 1 and 2, the voice assisted sunglasses of the present invention includes: a mount (100) that is worn on the body of a user; and a control unit (200) including a user movement information controller (210) combined with the mount (100) and measuring a moving distance and a moving speed of the user; and an output unit (220) informing the user of the information obtained by the movement information controller (210) using voice.

In detail, the movement information controller (210) finds out a location, a moving distance, a moving speed, and a moving time of a user in real time on the basis of GPS, and the output unit (220) transmits the information obtained by the movement information controller (210) to the user using voice so that the user can easily recognize in real time his/her location, moving distance, moving speed, and moving time while running, whereby the user can more stably run.

The voice assisted sunglasses of the present invention further includes an eye protector (110) designed to be disposed ahead of the user's eyes to protect the user's eyes and temples (120) which are coupled to both width-directional sides of the eye protector (110) and are worn on both sides of the user's head, so it is possible to protect the user's eyes when the user wears the voice assisted sunglasses. The output unit (220) includes a bond conduction speaker (221) and a bone conduction driving module (222) that transmits signals to the bone conduction speaker (221) in response to information transmitted from the movement information controller (210). Accordingly, it is possible to efficiently transmit the information such as the location, moving distance, moving speed, and moving time of a user obtained by the movement information controller (210) to the user using voice even under a noisy circumstance.

In detail, the movement information controller (210), the bone conduction driving module (222), and the bone conduction speaker (221) are disposed on a PCB substrate (201) of the control unit (200), so information obtained by the movement information controller (210) is converted into a specific electrical signal by the bone conduction driving module (222) and then transmitted to the bone conduction speaker (221), and the bone conduction speaker (221) can convert the received signal into vibration, whereby it is possible to transmit the information to a user using voice.

The bone conduction speaker (221) directly transmits a sound wave to the skull without through a medium of the atmosphere such as air, so it is preferable to dispose the bone conduction speaker (221) on the temples (120) that is brought in direct contact with a user's head, as shown in FIG. 1. Further, since the bone conduction speaker (221) directly transmits a sound wave to the skull, it is possible to more accurately transmit information to a user even under a noisy circumstance.

That is, it is possible to transmit information to not only non-disabled people, but blind people under a circumstance with a predetermined level or more noise such as a running situation or a marathon.

Further, the control unit (200), as shown in FIG. 2, may further include a battery unit (230) including a charging terminal (231) that is connected to an external charging cable, a battery (232) that is charged with power transmitted through the charging terminal (231), and a charging checker (233) transmitting the power input through the charging terminal (231) to the battery (232) and checking the charging state of the battery (232).

In detail, the voice assisted sunglasses of the present invention, which is a device that a user wears when he/she does external activities such as running or a marathon, needs energy for operating the movement information controller (210) and the output unit (220). Accordingly, as shown in FIG. 2, the battery unit (230) including the battery (232) that keeps electrical energy, the charging terminal (231) that is connected to an external cable to be supplied with electricity, and the charging checker (233) transmitting the power input through the charging terminal (231) to the battery (232) and checking the charging state of the battery (232) is coupled to the PCB substrate (201) so that the device can be used outdoors.

Figure 3:
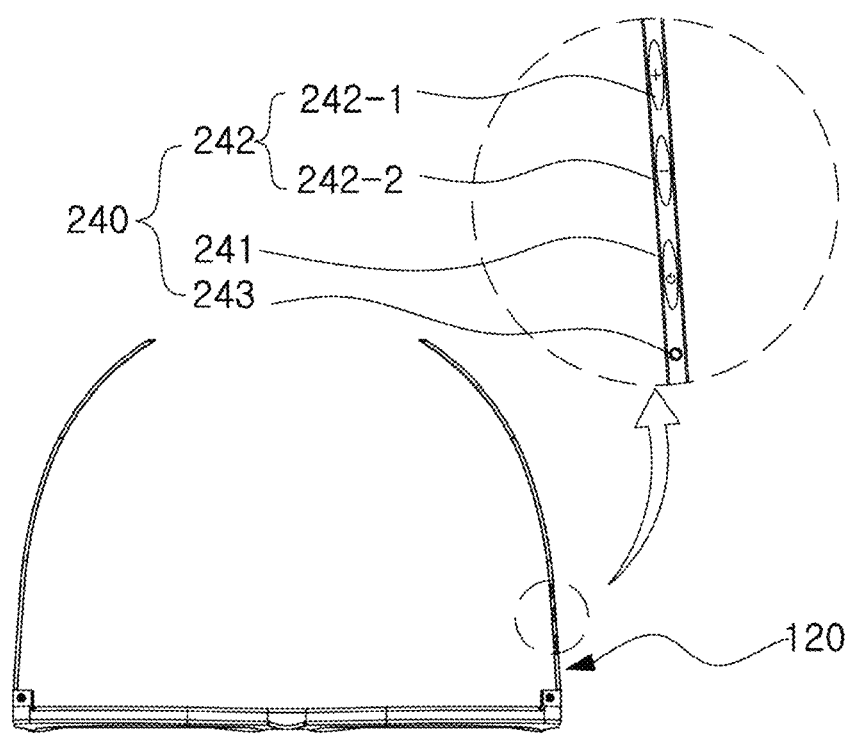
FIG. 3 is a planner view and a partially enlarged view showing a voice assisted sunglasses according to the present invention.

Further, referring to FIGS. 2 and 3, the control unit (200) may further include a switch unit (240) including an operation switch (241) protruding outward from the temple (120) and operating the movement information controller (210), a volume switch (242) controlling the volume of the output unit (220), and a real-time checking switch (243) immediately transmitting the location, moving distance, moving speed, and moving time of a user measured by the movement information controller (210) to the user through the output unit (220) when it is clicked.

In detail, when a user presses the operation switch (241) for about 3 seconds, an LED (121) shown in FIG. 1 is turned on and the movement information controller (210) can be operated. The user controls the volume of information to be transmitted to the user through the bone conduction speaker (221) by clicking a volume-up button (242-1) and a volume-down button (242-2) which compose the volume switch. Further, when a user clicks the real-time checking switch (243) to immediately know information such as his/her current location, moving distance, moving speed, and moving time, the movement information controller (210) can provide the information to the user in real time.

Further, the movement information controller (210) has a function that when a user operates the operation switch (241) by pressing it, the movement information controller (210) provides information such as the location, moving distance, moving speed, and moving time to the user every time the user moves a predetermined distance from the position where the user operated the movement information controller (210).

Further, the control unit (200) may further include a storage that accumulates and stores the information such as the location, moving distance, moving speed, and moving time while the user runs.

The user can recognize problems while running by checking the information such as the measured moving distance, moving speed, and moving time stored in the storage, so he/she can make a new plan for running without the problems.

Figure 4:
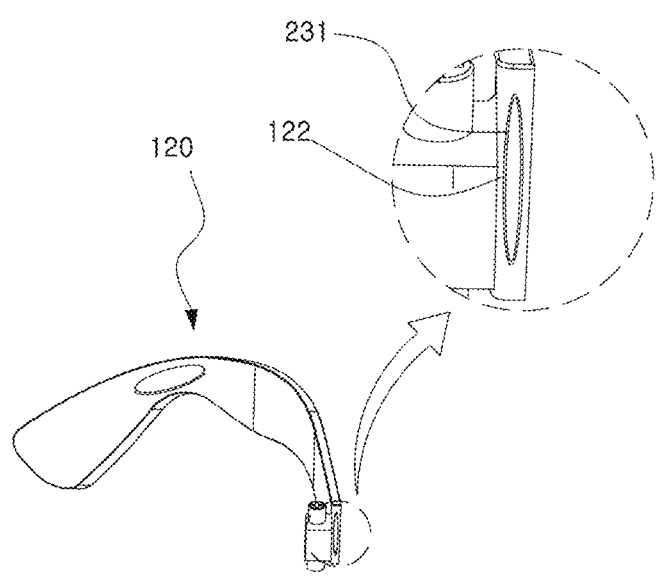
FIG. 4 is a perspective view and planner view and a partially enlarged view showing temples of a voice assisted sunglasses according to the present invention.

Further, referring to FIGS. 1 to 4, as shown in FIG. 1, the eye protector (110) and the temples (120) are hinged to each other, and the charging terminal (231), as shown in FIG. 4, is preferably disposed at a longitudinal first end of each of the temples (120) hinged to the eye protector (110).

In detail, the voice assisted sunglasses of the present invention, which is a device for assisting a user running or running a marathon, can be worn indoors, but are worn outdoors in many cases, and when a user runs or runs a marathon outdoors with the device on, foreign substances such as dust may flown into the charging terminals (231). Accordingly, coupling holes (122) in which the charging terminals (231) are fitted are formed at the first ends of the temples (120) hinged to the eye protector (110). Therefore, when a user wears the sunglasses, the eye protector (110) and the temples (120) make a predetermined angle to close the coupling holes (122) of the temples (120) in which the charging terminals (231) are fitted, thereby preventing foreign substances from flowing into the charging terminals (231).

Figure 5:
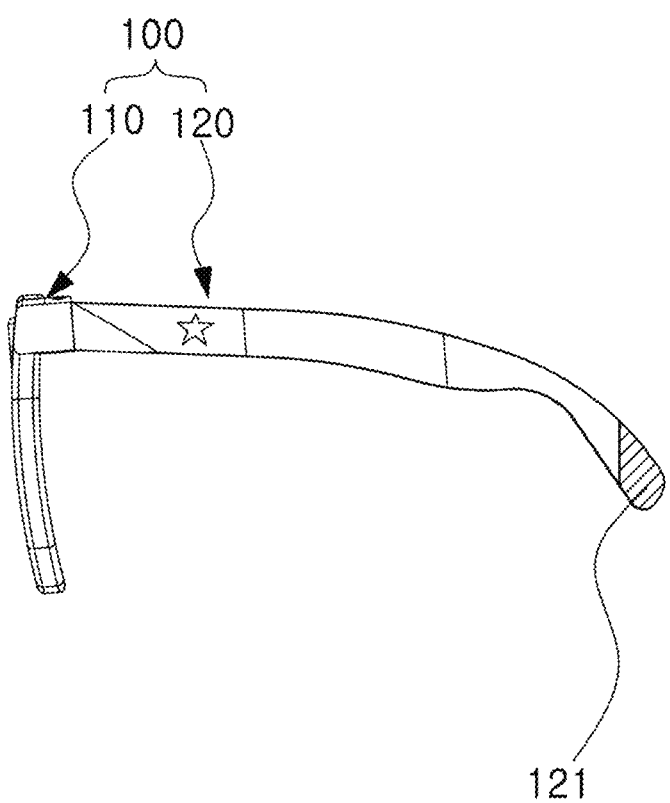
FIG. 5 is a side view showing an example in that a lighting portion is formed at a voice assisted sunglasses according to the present invention.
Figure 6:
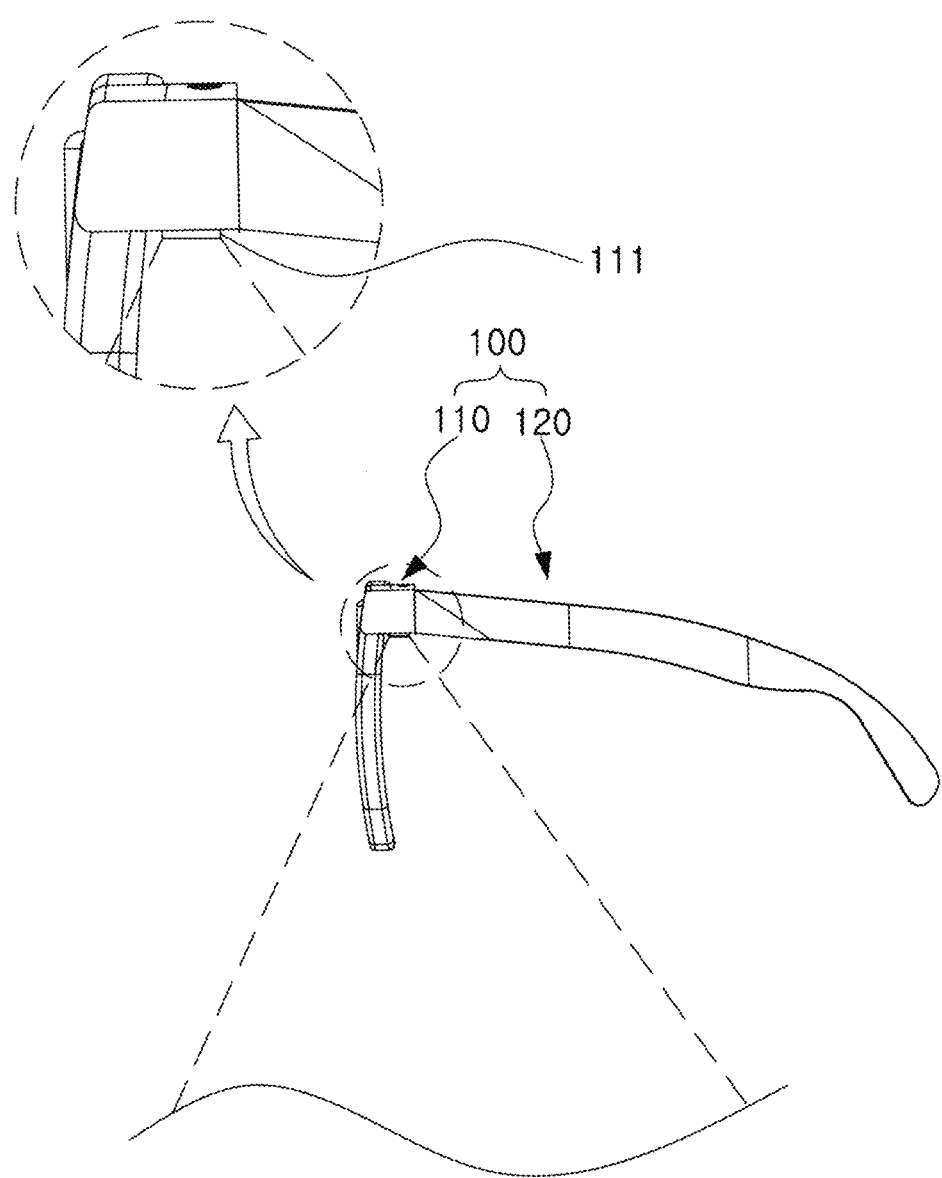
FIG. 6 is a side view showing an example in that motion recognition cameras are formed at a voice assisted sunglasses according to the present invention.

Further, it is preferable in the voice assisted sunglasses of the present invention that a lighting portion (121) is formed at a longitudinal second end of each of the temples (120), as shown in FIG. 5.

In detail, the environment may get dark while a race such as a marathon that takes long time progresses, so the lighting portions (121) that are turned on in a dark environment are formed at the longitudinal second ends of the temples (120) to prevent a collision of players who do not recognize the locations of each other.

Further, referring to FIGS. 1 to 6, in the voice assisted sunglasses of the present invention, motion recognition cameras (111) that recognize hand motions of a user are disposed on the bottom of width-directional ends of the eye protector (110), so the movement information controller (210) can transmit information such as the location, moving distance, moving speed, and moving time to a user through the output unit (220) when it recognizes the user making specific hand motions through the motion recognition cameras (111).

In detail, although the voice assisted sunglasses can transmit information such as the user's location, moving distance, moving speed, and moving time to the user in real time when the user clicks the real-time checking switch (243), the user has to stop swinging for obtaining propulsion in order to click the real-time checking switch (243). The user's running pace may be disturbed when he/she clicks the real-time checking switch (243) while running. Accordingly, the motion recognition cameras (111) that recognize hand motions of a user are disposed on the bottom of the width-directional ends of the eye protector (110) so that the movement information controller (210) can transmit information such as the location, moving distance, moving speed, and moving time to the user through the output unit (220) even if the user does not click the checking switch (243) when the motion recognition cameras (111) take pictures of the user' hands making specific motions.

Further, the voice assisted sunglasses may further include a microphone at the center of the eye protector (110), so a user can have conversation with others while running in a noisy situation using the microphone.

Further, though not shown in the figures, the voice assisted sunglasses of the present invention may further include a beacon that communicates with other adjacent voice assisted sunglasses.

In detail, blind people have difficulties in recognizing the accurate locations of other adjacent runners, so they may collide with other participants while running or running a marathon in which they run a predetermined course, and this problem cannot be prevented by a positioning technology having a predetermined or more positioning error such as GPS. Accordingly, a beacon having a communication range of about 3 m and being able to recognize runners before they collide is installed on sunglasses, so when another runner gets close within 3 m, the beacon informs a user of location information of the other runner, thereby preventing collision between different users.

Figure 7:
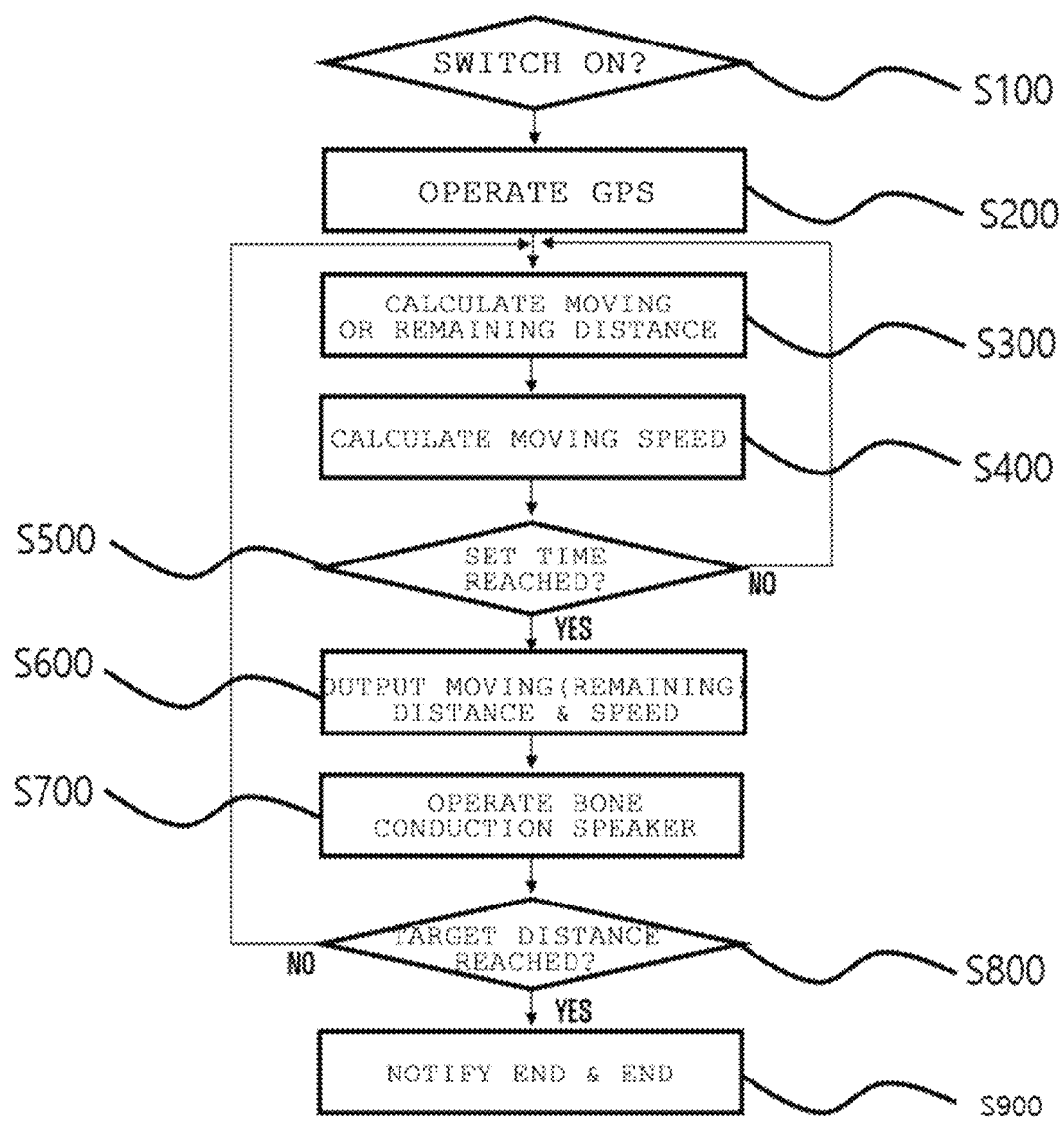
FIG. 7 is a flow chart showing an operation system of a voice assisted sunglasses according to the present invention.

FIG. 7 shows a method of using the voice assisted sunglasses of the present invention.

Referring to FIG. 7, the voice assisted sunglasses of the present invention can be controlled by a method of using the voice assisted sunglasses. The method includes: an operation step (S100) that drives the control unit (200) by pressing the operation switch (241); a GPS operation step (S200) that operates the movement information controller (210) and finds out the current location of a user using GPS; a distance calculation step (S300) that calculates a moving or remaining distance of the user by comparing a moving distance or a predetermined movement path of the user with the obtained user's location; a moving speed calculation step (S400) that calculates a moving speed of the user on the basis of the user's location that varies with time; a set time-checking step (S500) that checks whether time set by the user has been reached; an output step (S600) that outputs the location, moving distance, moving speed, and moving time of the user measured by the movement information controller (210) through the bone conduction driving module (222) when it is determined that the time set by the user has been reached; an information transmission step (S700) that transmits the information output through the bone conduction driving module (222) to the user using voice through the bone conduction speaker (221); and a target distance-reaching checking step (S800) that performs an ending step (S900) when the distance or location set by the user has been reached, and performs the distance calculation step (S300) again when it is determined that the distance or location set by the user has not been reached.

According to the voice assisted sunglasses having the configuration of the present invention, it is possible to enable a user to more efficiently control his/her pace by providing information such as a moving distance, a moving speed, a moving time, and a location to the user in real time using voice, so not only non-disabled people, but blind people can be assisted when they are running.

Further, since the device has the configuration of sunglasses, the center of gravity of a user is not made eccentric when the user wears the device, so it is possible to minimize inconvenience that a user feels when he/she wears a running assistant device.

Further, information is transmitted to a user through voice by a bone conduction speaker, so it is possible to more efficiently provide information to the user even under a noisy circumstance.

Further, since light is emitted rearward, it is possible to prevent a collision of users in a dark environment.

Further, it is possible to provide information such as a moving distance, a moving speed, and a moving time on the basis of hand motions even if a user does not specifically clicks a switch while running, so users can more conveniently use the sunglasses while running.

While the present invention has been described with respect to the specific embodiments, it will be apparent to those skilled in the art that various changes and modifications may be made without departing from the spirit and scope of the invention as defined in the following claims.

What is claimed is:

1. Voice assisted sunglasses comprising:
   a mount (100) that is worn on the body of a user; and
   a control unit (200) including a user movement information controller (210) which are combined with the mount (100) and measure a location, a moving time, a moving distance, and a moving speed of the user, and an output unit (220) informing the user of the information obtained by the movement information controller (210) using voice,
   wherein the mount (100) includes:
   an eye protector (110) designed to be disposed ahead of user's eyes to protect the user's eyes; and
   temples (120) which are coupled to both width-directional sides of the eye protector (110) and are worn on both sides of the user's head,
   wherein the output unit (220) includes:
   a bone conduction speaker (221); and
   a bone conduction driving module (222) that transmits signals to the bone conduction speaker (221) in response to information transmitted from the movement information controller (210),
   wherein the control unit (200) further includes a switch unit (240) including:
   an operation switch (241) that operates the movement information controller (210);
   a volume switch (242) that controls the volume of the output unit (220); and
   a real-time checking switch (243) that immediately transmits the location, moving distance, moving speed, and moving time of a user measured by the movement information controller (210) to the user through the output unit (220) when it is clicked,
   wherein when a user operates the operation switch (241) by pressing it, the movement information controller (210) provides the location, moving distance, moving speed, and moving time to the user every time the user moves a predetermined distance from the position where the user operated the movement information controller (210),
   wherein when a user clicks the real-time checking switch (243), the movement information controller (210) provides the location, moving distance, moving speed, and moving time to the user in real time, and
   wherein voice assisted sunglasses assist a user who runs by informing the user of a moving distance, a moving speed, a moving time, and a location.

2. The voice assisted sunglasses of claim 1, wherein the control unit (200) further includes:
   a battery unit (230) including a charging terminal (231) that is connected to an external charging cable;
   a battery (232) that is charged with power transmitted through the charging terminal (231); and
   a charging checker (233) that transmits the power input through the charging terminal (231) to the battery (232) and checks the charging state of the battery (232).

* * * * *